United States Patent Office 3,524,044
Patented Aug. 11, 1970

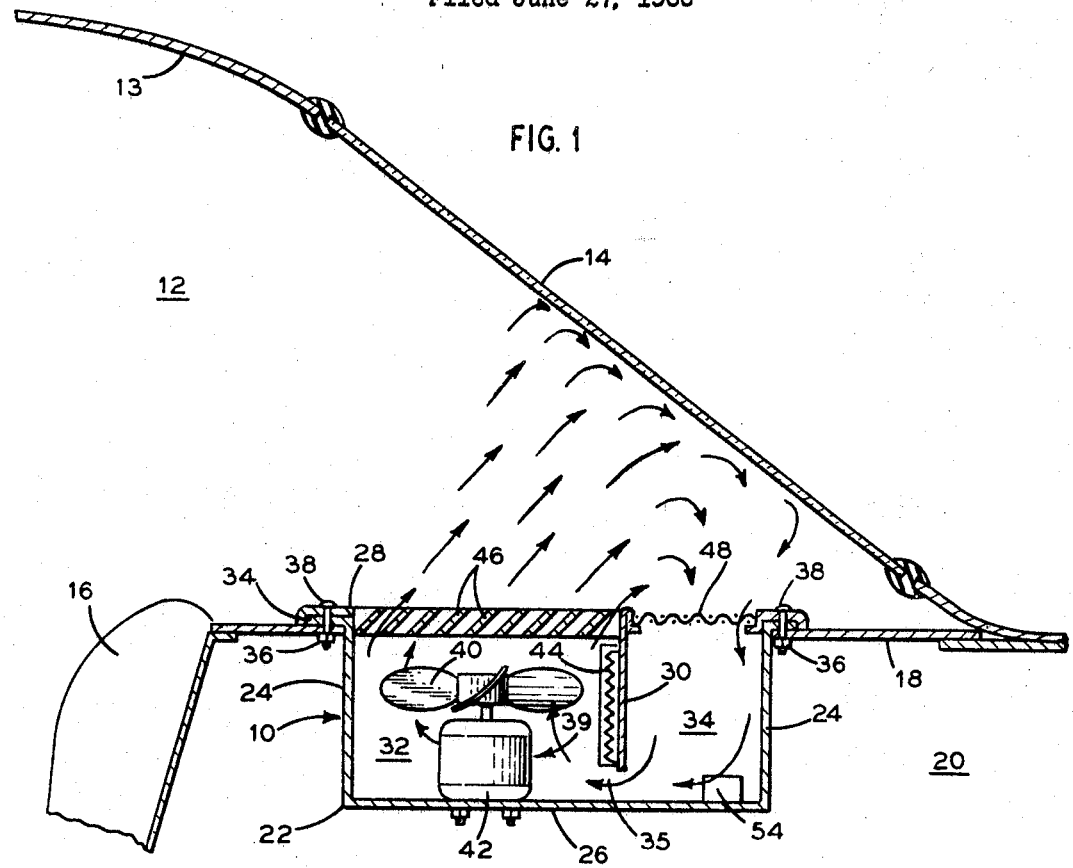

3,524,044
DEICING APPARATUS
Vincent L. Liardi, 2491 Columbus Ave.,
Oceanside, N.Y. 11572
Filed June 27, 1966, Ser. No. 560,600
Int. Cl. B60s 1/58
U.S. Cl. 219—203                                 4 Claims

ABSTRACT OF THE DISCLOSURE

A deicer for the rear window of an automobile includes an electric heater and fan contained within a housing covered by a louvered grille which is set into the horizontal partition located rearwardly of the back seat in the automobile. The major portion of the housing is disposed in an upper portion of the automobile trunk space. The heating element and fan are powered by the electrical system of the automobile so that air from the trunk or passenger compartment is drawn into the housing where it is heated and propelled toward the inside surface of the rear window for heating and deicing the window. In one embodiment the heating element is embedded in a mat adhesively secured to an inside surface of the housing. Alternatively, the heating element can be molded into one or more walls of the housing adjacent the fan.

---

This invention relates to apparatus for deicing the rear window of an automobile.

It is well known that a coating of ice or frost on the rear window of an automobile is an unsafe condition. And although various attempts have been made in the past to cope with the problem, none have received widespread consumer acceptance because of such disadvantages as cost, ineffectiveness, complexity, and difficulty of installation. It is therefore a principal object of the present invention to provide apparatus for deicing the rear window of an automobile which is inexpensive, effective, and simple to manufacture and install.

It is contemplated that the apparatus of the present invention will be installed in existing automobiles, possibly as an adjunct to less effective apparatus, although it is also possible to install the apparatus as original accessory equipment.

According to the present invention, the apparatus includes an electric heater and a fan contained within a housing covered by a louvered grille which is set into the horizontal parition or shell that is located rearward of the back seat in a sedan, with the major portion of the housing being disposed in an upper portion of the trunk. The heating element and fan are powered by the existing electrical system of the automobile so that air from the trunk, outdoors, or passenger compartment is drawn into the housing where it is heated and propelled toward the inside surface of the rear window for heating and deicing said window, after which the air is recirculated or allowed to remain in the passenger compartment.

In one embodiment of the invention the heating element may be embodied in a mat made of moldable material and secured to the inside surface of the housing, as by an adhesive. Alternatively, the heating element can be molded to one or more walls of the housing adjacent the fan, all of which will be described more fully hereinafter.

In the drawings:

FIG. 1 is a view, partly in elevation and partly in vertical section, of apparatus constructed and arranged according to the present invention;

FIG. 2 is a vertical sectional view, partly in elevation, of a modified form of the apparatus of FIG. 1;

FIG. 3 is a view showing the wiring diagram for the apparatus of the present invention; and FIG. 4 is a view similar to FIG. 3, showing a modification thereof.

The deicing apparatus 10 of FIG. 1 is installed adjacent the passenger compartment 12 of a conventionally arranged sedan body or shell (shown fragmentarily). The compartment 12 is defined in part by a roof 13, a forwardly inclined rear window 14, a rear seat 16, a horizontal partition or shelf 18 which, with an upright portion of seat 16, partitions the passenger compartment 12 from the storage zone or trunk 20.

As shown, the shelf 18 is disposed beneath the window 14; and, since shelf 18 extends rearwardly of seat 16, trunk 20 is rearward of seat 16 and below shelf 18, and the passenger compartment 12 is forward of seat 16 and above shelf 18.

The deicing apparatus 10 includes a housing 22 of generally parallelopipedal shape comprising side walls 24, a bottom wall 26, a top wall or cover 28, and a partition 30 extending downwardly from plate 28 for dividing the interior of the housing into a fan compartment 32 and an air inlet passageway 34. The partition 30 is spaced from the bottom wall 26 in order to provide communication between the air inlet passageway 34 and the fan compartment 32.

The upper portion of the housing 22 is provided with suitable lugs or flanges 34 which extend horizontally and outwardly of the side walls 24 to engage the margin of an opening cut into the shelf 18 to receive the housing 22, whereby the housing extends into an upper portion of the trunk space 20 and is secured by suitable securing means. The latter, may be nuts and bolts 36 and 38 which extend, as shown, through the cover plate 28, the flanges 34, and the shelf 18 to secure these parts in proper relation to one another and yet provide an attractive installation.

Disposed within the fan compartment 32 is a fan 39 comprising a propeller 40 driven by a motor 42 which is secured to the bottom wall 26. The fan motor 42 is preferably operable on 12 volt D.C. current of about 3 amperes available from the existing automotive electrical system; and by its location with the compartment 32 the heat equivalent of about 36 watts of electrical energy is added to the air contacted thereby. An electrical heating unit 44, also disposed within compartment 32 as shown, is preferably a wire resistance heating element which is embedded within a flexible mat of moldable, heat-resistant material and secured to the partition 30 by a suitable adhesive cement in position to heat the air moved by the fan 39.

The apparatus of FIG. 1 is adapted to heat air, direct it against the rear window 14, and recirculate a portion thereof for reheating. Thus, the top wall of cover plate 28 includes a first opening in registry with the fan compartment 32 to provide the housing 22 with an air outlet, and second opening in registry with the air inlet passageway 34 to provide an inlet to the housing 22. These openings providing the inlet and outlet are in registry with the opening in the shelf 18. A number of louvers 46 are disposed in the first opening to serve as a grille and also to direct heated air toward the rear window 14. A screen 48 of wire mesh, expanded metal, or other open work construction covers the housing inlet and yet readily admits air to the interior of the housing 22.

In operation, the apparatus 10 of FIG. 1, draws air from the passenger compartment 12 through the inlet screen 48 and passageway 34 into the fan compartment 32 where heat from the motor 42 and heating element 44 raises the temperature of the air as it moves therethrough and is discharged from the housing 22. The louvers 46 are inclined rearwardly and upwardly in order to direct the heated air toward the inside surface of the rear window 14. The direction of air movement is indicated by arrows in FIG. 1. Preferably, the air is directed either normal to the forwardly inclined window surface or at a slightly shallower angle which causes it to deflect downwardly toward the air inlet screen 48, thus facilitating recirculation and, hence, maximum deicing efficiency.

Referring now to FIG. 3, the simplest electrical circuitry for the apparatus utilizes the battery 50 of the existing electrical system, e.g. 12 volts D.C., and an on-off switch 52 for controlling the energization or deenergization of parallel circuits for the motor 52 and the heating element 44. Optionally, switch 52 can be a rheostat for regulating the fan speed and the heat delivered by the heating element 44.

As shown in FIG. 4, it is a further option to include a thermostat 54 for automatically interrupting the operation of the heating element 44 when the delivered air temperature exceeds a predetermined value. For example, thermostat 54 may be located in the air intake passageway 34 so that the energization of the element 44 is controlled in response to inlet air temperature, the latter being affected largely by the amount of heat given up to the window 14. In other words, with recirculated air it is desirable to limit the temperature of the air flowing through and out the apparatus, for reasons of economy, safety, and protection of the equipment; and for this purpose a thermostat 54 serves to halt further heating of the air by element 44 when the inlet air is already at a sufficiently high temperature to accomplish deicing, for example 120° F.

In FIG. 2 is shown apparatus which is of unusually compact size and which can be installed like the apparatus of FIG. 1. For the sake of brevity, most of the correspondingly similar elements of these two figures of the drawing are designated by like reference numerals. A feature of the apparatus of FIG. 2 is that the housing 22 is molded of heat-resistant, moldable material with its side walls 24 formed about the heating element 44 for the sake of manufacturing efficiency and economy, as well as compactness of size. The apparatus of FIG. 2 can be made suitable for operation with recirculated air by providing respective openings 60 and 62 in the shelf 18 and the bottom wall 26 of the housing 22, so that the intake air flows from opening 60, through the trunk 20, and into the opening 62.

With the apparatus of the invention installed as aforesaid it is only necessary to energize the heating element 44 and also the motor 42 of the fan 39, as with switch or rheostat 52, in order to blow quickly heated air against the inner surface of the rear window 14 to effect deicing, defrosting and defogging thereof.

What is claimed is:

1. In an automobile, the combination of deicing apparatus including a housing having an outlet for warm air in the top thereof and an inlet for the ingress of intake air to said housing, a heating element and a fan including an electric motor disposed within said housing; a body shell containing a rear seat including an upright structure and a horizontal partition extending rearward of said upright structure to divide the interior of said shell into a storage trunk which is rearward of said upright structure and below said partition and a passenger compartment which is forward of said upright structure and above said partition, said body shell including a rear window for said passenger compartment disposed above said partition and which is inclined forwardly of said body shell at an angle intermediate vertical and horizontal attitudes, with the housing of said deicing apparatus being disposed in an upper portion of said trunk, means for supporting said housing from said partition and in contact therewith, said partition being provided with a first opening in registry with the outlet of said housing, with louvers at the outlet of said housing for directing warm air from said housing toward said rear window, said housing including side walls, a bottom wall, a top wall, and a partitioning wall which extends downwardly from said top wall in spaced relation to said bottom wall for dividing the interior of said housing into a fan compartment open to said air outlet and an air inlet passageway open to said air inlet which are in communication with one another, said partition being provided with a second opening disposed in adjacent and registering relationship with said housing inlet, said heating element being attached to said partitioning wall and said fan motor being disposed in said fan compartment for heating the air flowing through said housing.

2. The combination according to claim 1 wherein said second opening is located rearwardly of said first opening, and said louvers at said outlet are inclined rearwardly and upwardly at an angle intermediate a horizontal attitude and an attitude normal to the surface of said rear window whereby the warm air discharged from said outlet is directed toward said window and deflected downwardly toward said inlet.

3. The combination according to claim 1, further including a battery connected in parallel electrical circuits with said heating element and said fan motor, and a temperature responsive switch disposed in said housing adjacent said inlet and connected in one of said electrical circuits with said heating element for deenergizing said heating element when the intake air temperature is above a predetermined value.

4. The combination according to claim 1 wherein said supporting means for said housing comprises flange structure extending horizontally outwardly of said housing and resting on said partition adjacent said first opening; said housing including a top wall formed separately of the rest of said housing and covering said first opening and said flange structure; and securing means extending through said top wall, said flange structure and said partition.

References Cited

UNITED STATES PATENTS

| 1,465,292 | 8/1923 | Wessig | 98—92 X |
| 2,693,613 | 11/1954 | Zeigler et al. | 52—171 X |
| 2,675,588 | 4/1954 | Simons et al. | |
| 2,725,605 | 12/1955 | Haltenberger. | |
| 2,738,408 | 3/1956 | Cheviron | 219—203 |
| 2,785,273 | 3/1957 | Arnett | 219—369 X |
| 3,018,711 | 1/1962 | Welch et al. | 98—2 |
| 3,303,325 | 2/1967 | Hubrich | 219—371 X |
| 2,263,174 | 11/1941 | Klauber | 219—374 X |

FOREIGN PATENTS 223,374  2/1958  Australia.

ANTHONY BARTIS, Primary Examiner

U.S. Cl. X.R.

52—171; 98—2; 219—368, 369